(12) United States Patent
Okano et al.

(10) Patent No.: US 9,939,066 B2
(45) Date of Patent: Apr. 10, 2018

(54) ELASTIC SEALING MEMBER RADIALLY INWARDLY OF PRIMARY SEALING BEAD

(71) Applicant: Federal-Mogul Corporation, Southfield, MI (US)

(72) Inventors: Takashi Okano, Commerce Township, MI (US); Steven Honkala, Wolverine Lake, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 13/804,853

(22) Filed: Mar. 14, 2013

(65) Prior Publication Data

US 2014/0265156 A1    Sep. 18, 2014

(51) Int. Cl.
*F02F 11/00* (2006.01)
*F16J 15/08* (2006.01)

(52) U.S. Cl.
CPC ...... *F16J 15/0825* (2013.01); *F16J 2015/085* (2013.01); *F16J 2015/0862* (2013.01)

(58) Field of Classification Search
CPC .... F16J 15/0818; F16J 15/123; F16J 15/0825; F16J 2015/085; F16J 2015/0862
USPC ........................................ 277/590, 591, 593
See application file for complete search history.

(56) References Cited

U.S. PATENT DOCUMENTS

| | | | |
|---|---|---|---|
| 5,725,222 A | 3/1998 | Kobayashi | |
| 5,924,700 A | 7/1999 | Kobayashi | |
| 6,722,662 B2 | 4/2004 | Heilig et al. | |
| 6,796,562 B2 | 9/2004 | Stapel | |
| 6,827,352 B2 | 12/2004 | Ueta et al. | |
| 6,899,340 B2 | 5/2005 | Inciong | |
| 6,962,345 B2 | 11/2005 | Inciong et al. | |
| 7,000,924 B2* | 2/2006 | Hohe | F16J 15/0818 277/593 |
| 7,234,705 B2 | 6/2007 | Novil et al. | |
| 7,374,177 B2* | 5/2008 | Tripathy | F16J 15/0825 277/593 |
| 8,011,674 B2* | 9/2011 | Imai | 277/593 |
| 8,100,409 B2* | 1/2012 | Schmitz | 277/593 |
| 2001/0017446 A1 | 8/2001 | Jinno | |

(Continued)

FOREIGN PATENT DOCUMENTS

| | | | |
|---|---|---|---|
| EP | 982517 A1 | 3/2000 | |
| EP | 2325529 A1 | 5/2011 | |

(Continued)

OTHER PUBLICATIONS

International search report dated May 26, 2014 (PCT/US2014/019712).

*Primary Examiner* — Nathan Cumar
(74) *Attorney, Agent, or Firm* — Robert L. Stearns; Dickinson Wright, PLLC

(57) ABSTRACT

A gasket assembly having a secondary elastic sealing bead positioned radially inwardly of the primary sealing bead. The secondary sealing bead extends circumferentially about the aperture and radially inwardly of the primary sealing bead. A stopper layer is disposed adjacent at least a portion of the gasket layer and extends radially from the outboard region to the inboard edge to radially overlap the secondary sealing bead and the primary sealing bead. The secondary sealing bead has an "S-type" structure and provides increased gasket resiliency adjacent the inboard edge.

7 Claims, 6 Drawing Sheets

(56) References Cited

U.S. PATENT DOCUMENTS

| | | |
|---|---|---|
| 2002/0017762 A1 | 2/2002 | Inamura |
| 2003/0151210 A1* | 8/2003 | Ueta .................. F16J 15/0825 |
| | | 277/595 |
| 2003/0230858 A1 | 12/2003 | Matsuki et al. |
| 2005/0093248 A1 | 5/2005 | Udagawa |
| 2005/0206091 A1 | 9/2005 | Detmann |
| 2006/0097459 A1 | 5/2006 | Hohe et al. |
| 2006/0131818 A1 | 6/2006 | Diez |
| 2006/0175763 A1 | 8/2006 | Duckek et al. |
| 2007/0200301 A1 | 8/2007 | Novil et al. |
| 2009/0066036 A1 | 3/2009 | Schmitz |
| 2009/0166985 A1 | 7/2009 | Hohe |
| 2009/0184478 A1 | 7/2009 | Imai |
| 2009/0200752 A1* | 8/2009 | Okano .................. F16J 15/0825 |
| | | 277/592 |
| 2010/0109255 A1 | 5/2010 | Waldvogel |
| 2010/0327540 A1* | 12/2010 | Okano .................. F02F 11/002 |
| | | 277/592 |
| 2011/0254232 A1* | 10/2011 | Takeda et al. ................ 277/591 |
| 2011/0298186 A1* | 12/2011 | Klinner ........................ 277/654 |

FOREIGN PATENT DOCUMENTS

| | | | |
|---|---|---|---|
| JP | 2001295941 A | 10/2001 | |
| JP | 2002054741 A | 2/2002 | |
| JP | 2009062934 A | 3/2009 | |
| WO | 02070886 A | 9/2002 | |
| WO | 2009102921 A2 | 8/2009 | |
| WO | 2010151616 A2 | 12/2010 | |
| WO | 2012106436 A2 | 8/2012 | |

* cited by examiner

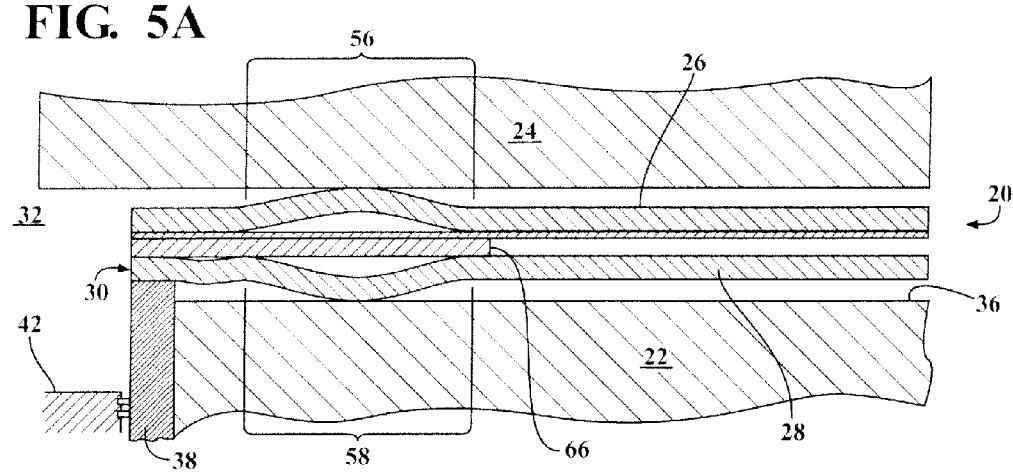
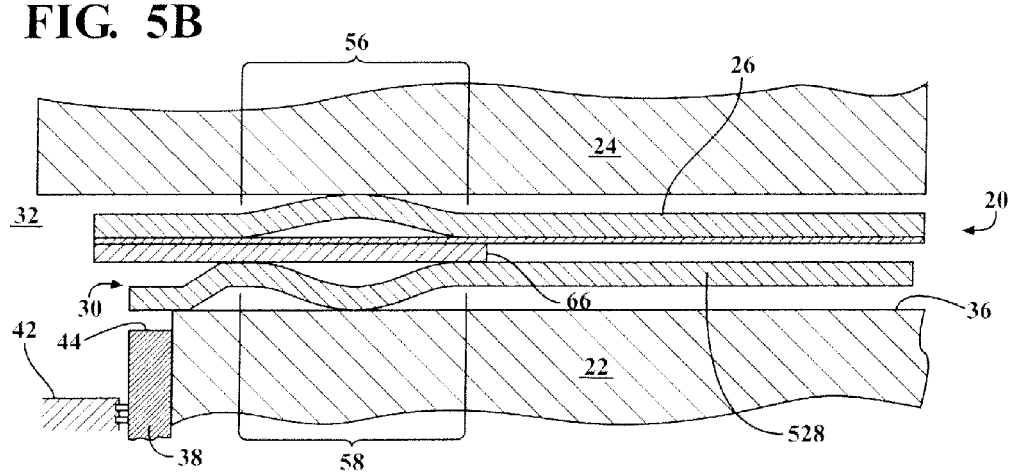

ELASTIC SEALING MEMBER RADIALLY INWARDLY OF PRIMARY SEALING BEAD

BACKGROUND OF THE INVENTION

1. Field of the Invention

The subject invention relates generally to multi-layered gasket assemblies for use in internal combustion engines.

2. Related Art

Multi-layered gasket assemblies are traditionally used to form a seal between two mating components of a mechanical system or device, such as an internal combustion engine, to prevent leakage of combustion gases, cooling water, lubricating oil, or the like. Common applications involve placing a multi-layered gasket assembly between an engine block and a cylinder head and between a cylinder head and an exhaust manifold. Cylinder head gaskets typically extend around the cylinder bores of an engine to seal high-pressure combustion gases within the cylinder bores as well as to seal oil and coolant passages. Exhaust manifold gaskets typically extend around the exhaust ports of an engine to seal high temperature exhaust gases flowing into the exhaust system. Once installed, the multi-layered gasket assembly bears the load from a bolted connection of the engine components and relies upon this load to provide an adequate seal therebetween.

Many of today's internal combustion engines utilize sleeves, also known as cylinder liners, which are inserted into the cylinder bores of the engine block. The sleeves are generally cylindrical in shape and are disposed in the cylinder bore between the engine block and piston. Often, the sleeves are made of a different metal or alloy than that used for the engine block. For example, an internal combustion engine may have an engine block that is made of aluminum and sleeves made of steel or cast iron. These metals have different rates of thermal expansion. Accordingly, a condition may occur during the operation of the engine where the sleeve undergoes thermal loading and expands and contracts axially with respect to the cylinder bore. As the sleeve is subject to high temperature, the sleeve may expand axially and deform the gasket assembly thereby permanently changing the shape. Such a permanent deformation of the gasket assembly is undesired because of the resiliency of the gasket assembly is lost affecting the sealing capability of the gasket. As the sleeve cools, the sleeve may contract axially and leave a gap between the sleeve and the gasket assembly causing a small combustion gas leak.

Prior art multi-layered gasket assemblies typically include gasket layers having inboard edges circumscribing the apertures. The gasket layers also have outboard regions radially spaced from the apertures. In cylinder head gasket applications, the apertures correspond with cylinder bores of the internal combustion engine. In exhaust manifold gasket applications, the apertures typically correspond with the exhaust ports of the internal combustion engine. Typically, several gasket layers are stacked in relation to one another. The gasket layers also typically include sealing beads disposed between the inboard edge and the outboard region to increase the sealing capability. The sealing beads extend annularly about each aperture. The sealing beads may include a primary sealing bead extending circumferentially about the aperture. The sealing beads may further include a secondary sealing bead adjacent the primary sealing bead.

Some of the prior art multi-layered gaskets include a stopper layer disposed between the gasket layers, such as disclosed in U.S. Pat. No. 6,722,662 to Heilig et al. and U.S. Pat. No. 6,827,352 to Ueta et al. Despite the existence and positioning of the stopper layer, small combustion gas leaks can develop between the stopper layer and the gasket layer, particularly due to the expansion and contraction of the cylinder bore sleeve during use of the engine.

SUMMARY OF THE INVENTION

In accordance with an embodiment of the invention, the gasket assembly includes a gasket layer having inboard edges circumscribing the cylinder bores and outboard regions radially spaced from the apertures. Primary sealing beads are disposed between the inboard edge and the outboard region. Secondary sealing beads are disposed in the gasket layer between the primary sealing beads and the inboard edges. Stopper layers extend radially from the outboard region to the inboard edge of the gasket layer. The stopper layers entirely overlap the primary sealing beads and the secondary sealing beads. Intermediate layers can be included also.

The inventive gasket assembly is more resilient and can accommodate the expansion and contraction of the cylinder sleeves as they expand and contract during use. With the stopper layer overlapping both beads, the compressive force exerted on the gasket assemblies by the expanding sleeves is distributed over the entire radial length of both sealing beads. This prevents the sleeves from deforming the sealing beads and from creating possible gas leaks.

BRIEF DESCRIPTION OF THE DRAWINGS

These and other advantages and features of the present invention will be readily appreciated, as the same becomes better understood by reference to the following detailed description when considered in connection with the accompanying drawings.

FIGS. 5A and 5B schematically depict use of an embodiment of the present invention.

DESCRIPTION OF THE ENABLING EMBODIMENT

Referring to the Figures, wherein like numerals indicate corresponding parts throughout the several views, a multi-layer steel gasket assembly 20 is illustrated for use to provide sealing between an engine block and a cylinder head of an internal combustion engine. Referring to FIGS. 1A-D, the gasket assembly 20 includes a pair of gasket layers 26, 28 having an inboard edge 30 which in use would circumscribe an aperture in a cylinder block. The assembly has outboard region 34 radially spaced from the inboard edge 30.

Figure 3:
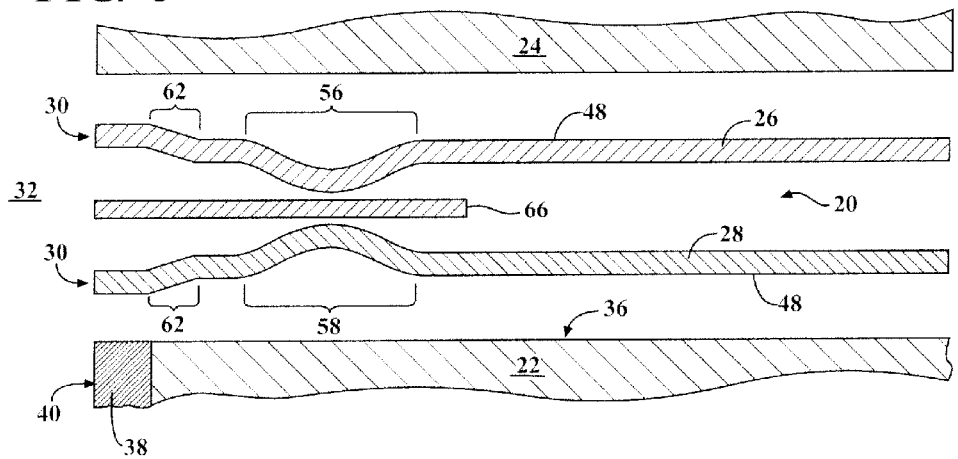
FIG. 3 is a fragmentary cross sectional view of an embodiment of a multi-layered gasket assembly in accordance with the invention and disposed between a cylinder head and an engine block.
Figure 4A:
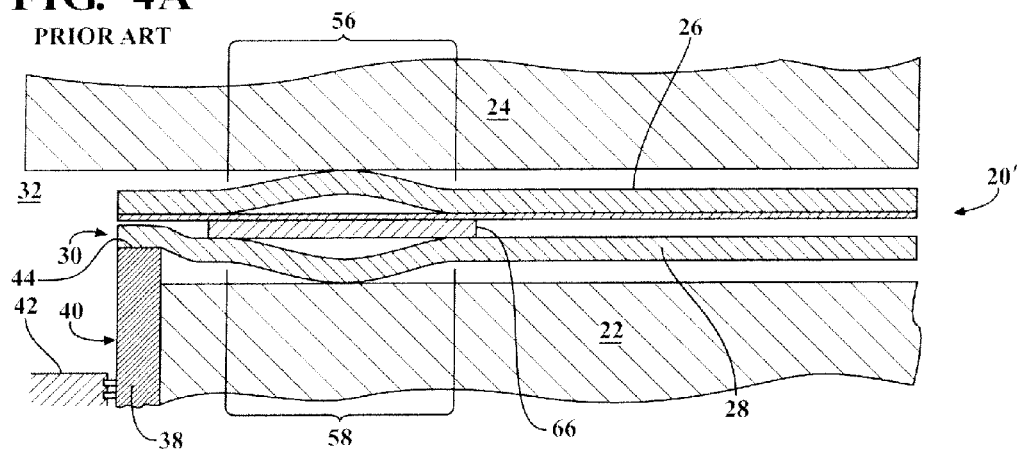
FIGS. 4A and 4B schematically depict a prior art multi-layered gasket assembly disposed between a cylinder head and engine block and illustrating the expansion and contraction of a cylinder sleeve member.
Figure 4B:
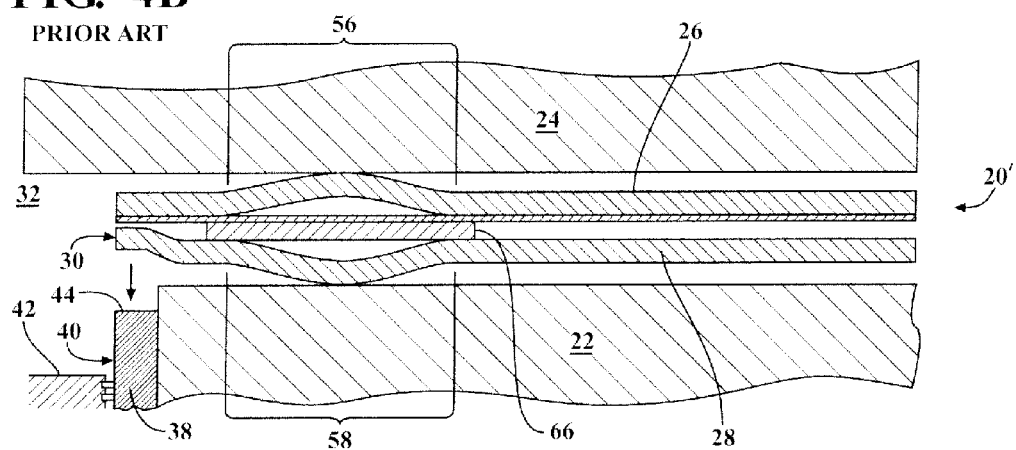

It is to be understood that although the present invention has particular use for sealing apertures in cylinder blocks, the invention can also be used to seal other apertures in other areas, such as exhaust ports, cooling channels, threaded bores for receiving fasteners, and other apertures and voids in the cylinder head or engine block. As shown in FIGS. 3 and 4A-4B, the engine block 22 may further include a deck surface 36 adjacent the cylinder head 24 and at least one sleeve 38 disposed in the cylinder forming an inner cylinder wall 40.

Also, it is preferred that the inboard edges 30 of the gasket layers 26, 28 be radially aligned with the cylinder wall. If the engine has sleeve members 38 positioned in the cylinder bores, as shown in FIGS. 5A-5B, then it is preferred that the inboard edges 30 be aligned with the radially inner walls of the sleeve members.

The cylinder sleeve member 38 is generally cylindrical in shape and is disposed in the cylinder bore between the engine block 22 and piston 42. The sleeve 38 may be made of a different metal or alloy than that used for the engine block 22. For example, the engine block 22 may be made of aluminum and sleeves 38 may be made of steel or cast iron. These metals have different rates of thermal expansion. Accordingly, a condition may occur during the operation of the engine where the sleeve 38 undergoes thermal loading and expands and contracts axially with respect to the cylinder bore. Since the sleeve 38 is constrained in the cylinder bore, the principal expansion and contraction is axial travel of an exposed end 44 of the sleeve 38 adjacent the deck surface 36 of the cylinder block. As the sleeve 38 is subjected to high temperatures during use of the engine, the sleeve member 38 may expand axially such that the exposed end 44 protrudes from the deck surface 36 as shown in FIG. 4A. As depicted in FIGS. 4A and 4B, this expansion can deform prior art gasket assemblies 20' permanently deforming them. This can reduce the resiliency of the gasket assembly 20' resulting in poorer sealing capability. As shown in FIG. 4B, when the sleeve 38 is cooled or subjected to lower temperatures 32 the sleeve 38 may contract axially such that the exposed end 44 can recede into the cylinder bore 32 leaving a gap between the exposed end and the gasket assembly 20'.

Although the present invention has particular use where the cylinder liner is pressed into place in a cylinder bore, the invention also has benefits when used with engines with cast-over liners or with engines without liners.

Referring back to FIGS. 1A-D and FIGS. 2A-D, the gasket assembly includes a plurality of metal gasket layers 26, 28 stacked in relation to one another. The metal gasket layers 26, 28 are axially aligned and generally co-extensive with one another. Each of the gasket layers 26, 28 presents an inner face 46 and an outer face 48 opposite the inner face 46. A gasket assembly can include any number of gasket layers in accordance with the invention. Only two layers are shown in the exemplary embodiment disclosed herein. Where the gasket assembly 20 has two gasket layers 26, 28 including a first gasket layer 26 and a second gasket layer 28, the inner faces 46 of the first and second gasket layers 26, 28 face one another. As shown in FIGS. 3 and 5A-5B the outer face 48 of the first gasket layer 26 mates with the cylinder head 24 of the internal combustion engine and the outer face 48 of the second gasket layer 28 mates with the engine block 22 of the internal combustion engine. In particular, the outer face 48 of the second gasket layer 28 mates with the deck surface 36 of the engine block 22.

Figure 6:
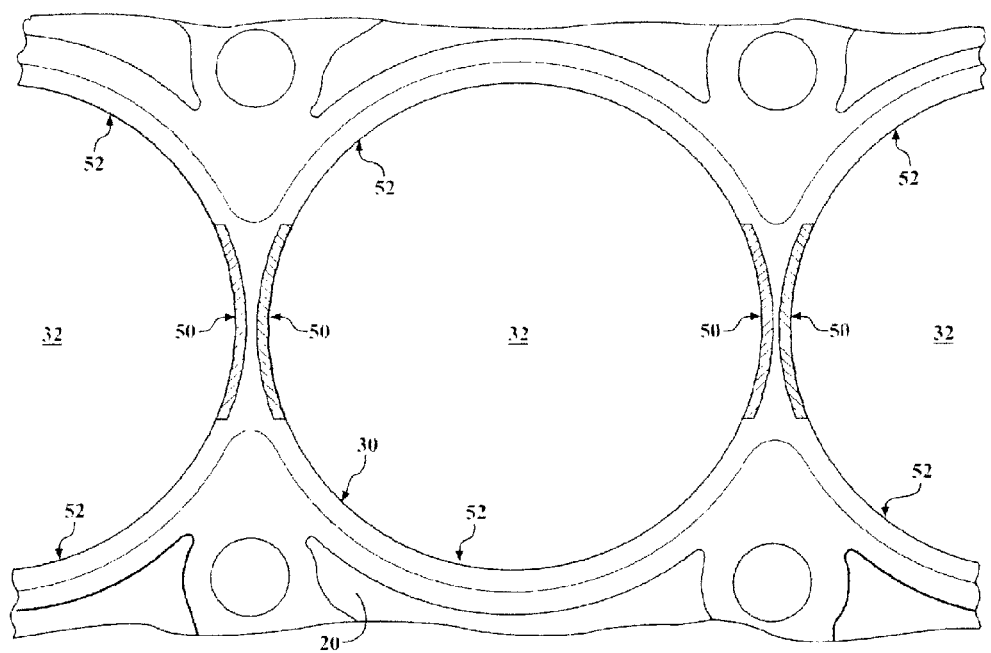
FIG. 6 is a top elevational view disclosing an embodiment of the invention.

Referring to FIG. 6, the inboard edges of the gasket layers may include a pair of axially aligned bridge portions 50 of limited circumferential extent spaced by side portions 52. Together, the bridge portions 50 and the side portions 52 of the inboard edge 30 entirely circumscribe the aperture 32. For example, the aperture 32 may be bounded on two edge areas by the axially aligned gasket assembly bridge portions 50 and on the other areas by gasket assembly portions 52. As noted above, the aperture 32 is typically one of a series of axially aligned apertures spaced apart by a series of bridge portions. According to this configuration, the bridge portions 50 are disposed between adjacent apertures 32. The gasket assemblies 20 are typically subject to increased heat and pressure at the bridge portions 50 and the elevated operational characteristics often lead to sealing problems and gasket failures in these areas. Moreover, the spacing between adjacent sleeves in the bridge portion 50 is small such that any unevenness in the deck surfaces caused by thermal loading of the sleeves 38 can be exaggerated. Accordingly, there is a greater need for improved gasket assemblies having greater sealing capability particularly at the bridge portions.

Although FIG. 6 refers to use of the invention particularly at bridge portions between adjacent cylinder bores, it is to be understood that such an embodiment is an alternate embodiment of the invention. Preferably, the invention which utilizes a primary sealing bead and an elastic secondary sealing bead is provided around the entire circumference of the bore.

Referring again to FIGS. 1A-D, the embodiment of the gasket assembly 20 may further include an intermediary layer 54 co-extensive with and disposed between two of the gasket layers 26, 28. It should be appreciated that the intermediary layer 54 of the gasket assembly 20 may be attached to one or more of the gasket layers 26, 28. A variety of attachment means can be used including but not limited to adhesives, fasteners, welding, and crimping.

Referring to FIGS. 1A-D and FIGS. 2A-D, the embodiments of gasket assemblies in accordance with the present invention include primary sealing beads 56, 58 positioned between the inboard edge 30 and the outboard region 34. The primary sealing beads 56, 58 may take a variety of different shapes and may extend in several directions. The primary sealing bead 56, 58 extends circumferentially about the aperture 32 and radially along a first radial length 60. The first radial length 60 corresponds to a maximum radial length as measured between the two most radially distant points of the structure forming the primary sealing bead 56, 58.

The primary sealing beads 56, 58 are spaced from the inboard edge 30 of the gasket layer 26, 28 and typically completely enclose and surround the aperture. The primary sealing beads may have concave shapes relative to the intermediate layers 54 as shown in FIGS. 1A-1D, FIG. 2D, and FIG. 3, or the primary sealing beads may have convex shapes relative to the intermediate layers 54, as shown in FIGS. 2A-2C and 5A-5B.

The gasket assemblies 20 also include at least one secondary sealing bead 62 disposed between the primary sealing bead 56, 58 and the inboard edge 30 of the gasket layers. Accordingly, the secondary sealing beads 62 are positioned radially inward of the primary sealing bead 56, 58 and preferably extend circumferentially entirely around and enclose the aperture. In an alternate embodiment, the secondary sealing bead 62 may have a limited circumferential extent and extend along only the axially aligned bridge portions 50 of the gasket assembly. Referring to FIG. 6, the central aperture 32 is flanked on either side by bridge portions 50 each featuring the secondary sealing bead 62 wherein the limited circumferential extend of the secondary sealing bead 62 is co-extensive with the bridge portions 50 and is equal to only a fraction of the circumferential extent of the inboard edge 30.

Figure 1A:
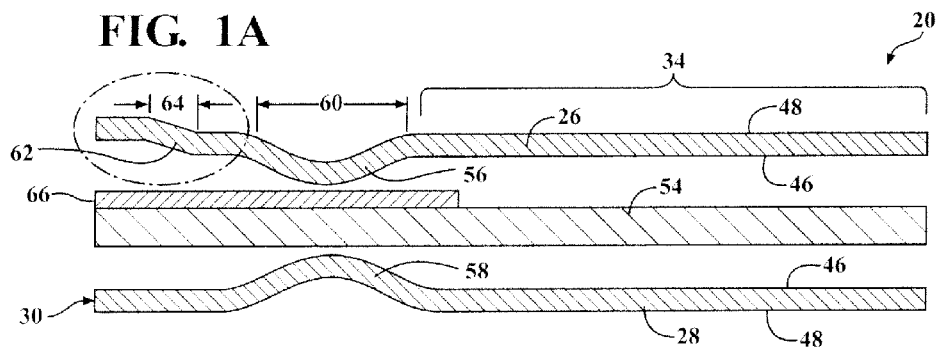
FIG. 1A is a fragmentary cross sectional view of an embodiment of a multi-layered gasket assembly in accordance with the invention.
Figure 1B:
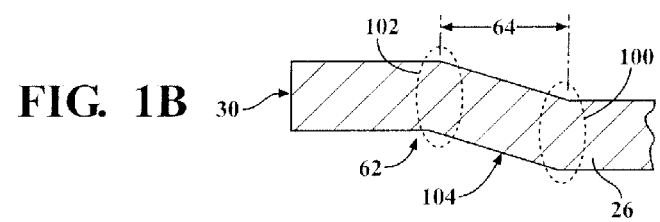
FIG. 1B is an exploded cross sectional view of a portion of the embodiment shown in FIG. 1A.
Figure 1C:
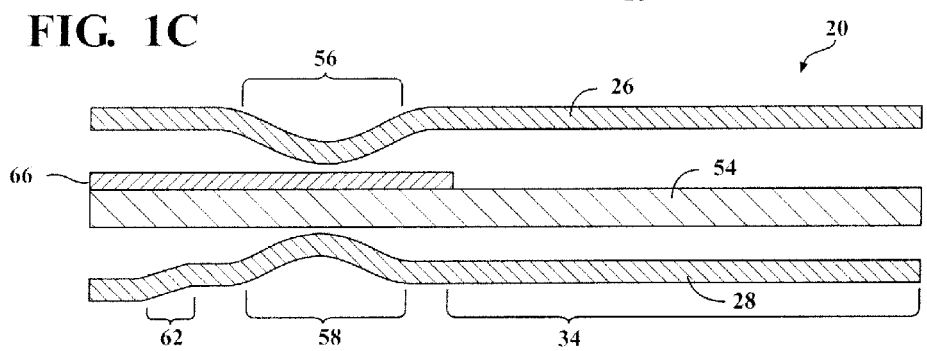
FIGS. 1C and 1D are fragmentary cross sectional views of other embodiments of the invention.
Figure 1D:
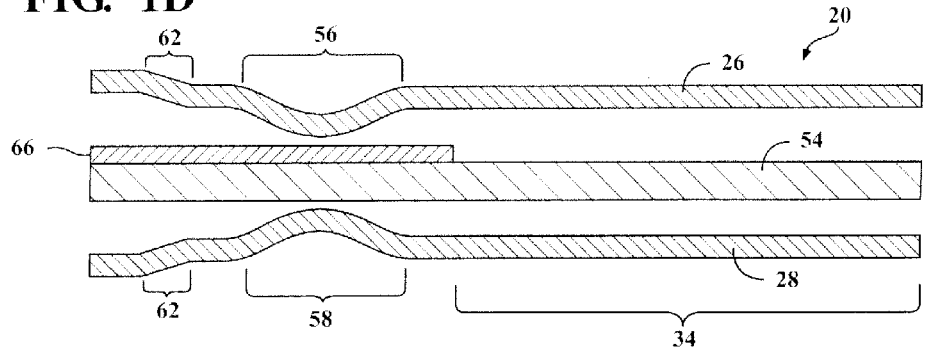
Figure 2A:
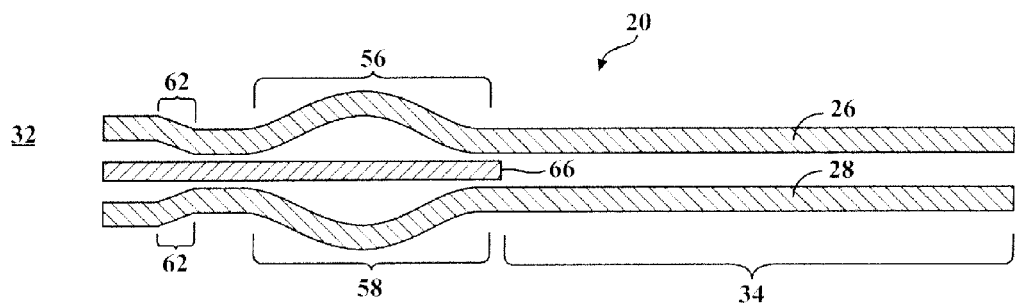
FIGS. 2A-2D depict additional embodiments of a gasket assembly in accordance with the invention.
Figure 2B:
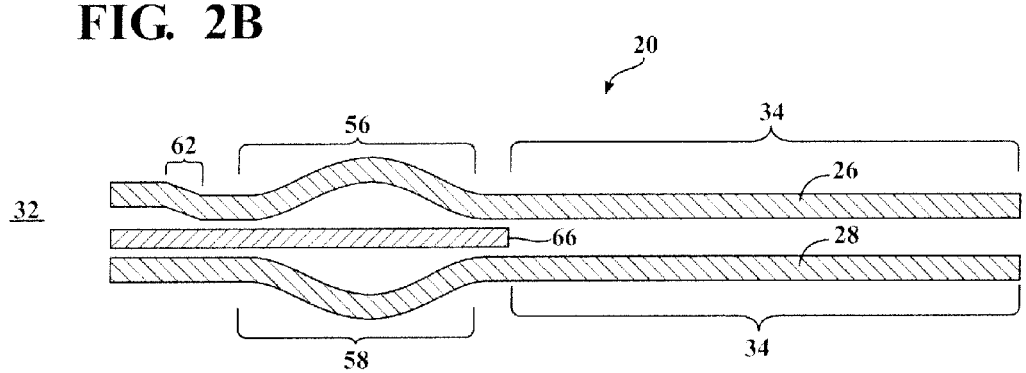
Figure 2C:
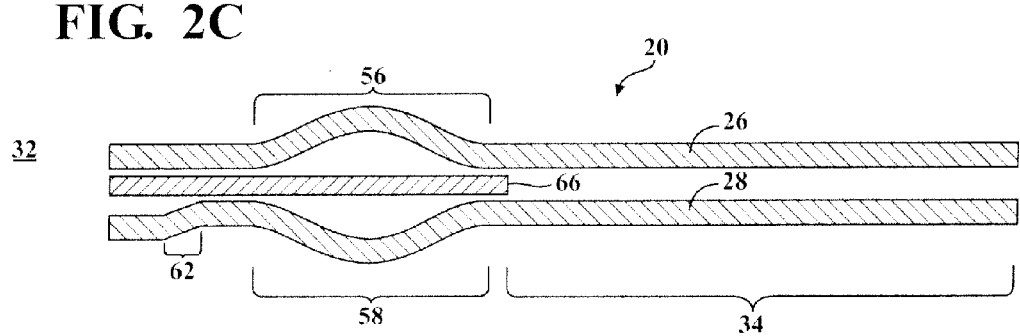
Figure 2D:
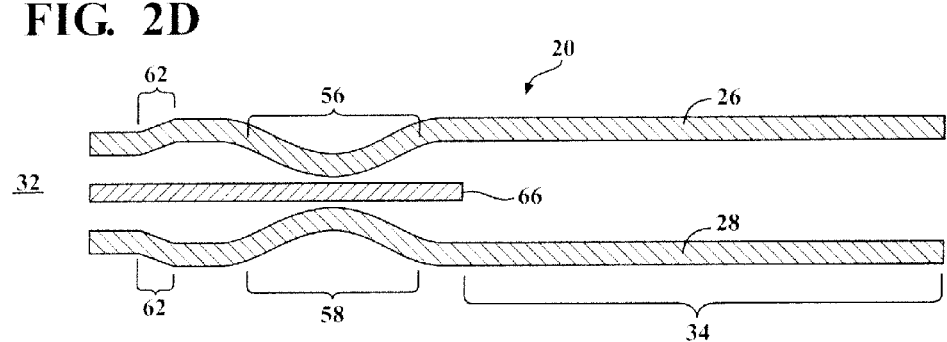

The secondary sealing beads 62 extends radially along a second radial length 64 corresponding to a maximum radial length as measured between the two most radially distant points of the structure forming the secondary sealing bead 62. The secondary sealing bead 62 may take a variety of different shapes and may extend in several directions and can be described generally as having an "S-type" shape and curvature. Referring to FIG. 1B, the secondary sealing bead 62 includes a bend generally following an "ogee" curve. As the term is understood in geometry, an ogee curve is shaped somewhat like the letter S and approximates the tangent function. Accordingly, an ogee curve has a pair of oppositely curving arcs each extending from a common tangent point and terminating at a pair of parallel ends. Where the secondary sealing bead 62 follows the form of an ogee curve, the second radial length 64 may be measured between the parallel ends. As shown in FIGS. 1A-1D and FIG. 3, the bend of the secondary sealing bead 62 may generally open outwardly away from the intermediary layer 54. Alternatively, as shown in FIGS. 2A-2D and 5A-5B, the bend may generally close inwardly towards the intermediary layer 54.

In general, the "S-type" curve of the secondary either bends toward or away from the convex or concave curved structure of the primary sealing bead. The "S-type curve" starts with a first end in alignment with the planar structure of the gasket layer, curves up or down in a first portion away from the plane of the gasket layer and then terminates with a second end back in alignment with the plane of the gasket layer. This shape is shown in FIGS. 1A-1D, 2A-2D, 3, and 5A-5B, particularly in the enlarged view of FIG. 1B.

Taking FIG. 1B as being representative, the first end of the secondary sealing bead 62 is indicated by the reference numeral 100, the second end by the reference numeral 102, and the intermediate angled or curved area by the reference numeral 104. The second ends 102 are the closest to the cylinder bore and ends 30 of the gasket layers, while the first ends 100 are the areas radially farthest from the ends 30.

Referring to FIGS. 1A-1D, 2A-2D, 3, and FIGS. 5A-5B, the gasket assembly 20 includes a stopper layer 66 adjacent at least a portion of the gasket layers 26, 28. For example, the stopper layer 66 may be disposed between one of the gasket layers 26, 28 and the intermediary layer 54 or between two gasket layers 26, 28 where the intermediary layer 54 is not included. The stopper layer 66 extends radially from the outboard region 34 to the inboard edge 30 and entirely overlaps the first radial length 60 of the primary sealing bead 56, 58 and the second radial length 64 of the secondary sealing bead 62. Referring to FIGS. 5A and 5B, this specific structure produces a gasket assembly 20 that is can accommodate the expansion and contraction of the cylinder sleeve 38 as it undergoes thermal loading. More specifically, by overlapping both beads 56-58 and 62, the compressive force exerted on the gasket assembly 20 by the expanding sleeve 38 is distributed over the entire radial length of both sealing beads. As shown in FIG. 5A, this prevents the sleeve 38 from structurally deforming one of the sealing beads 56, 58, 62 as it expands under high temperatures. As shown in FIG. 5B, the resiliency of the gasket assembly 20 adjacent the inboard edge 30 is preserved and the secondary sealing bead 62 will return to an uncompressed state against, and in sealingly contact with, the engine block 22 when the sleeve 38 retracts. The stopper layer 66 provides increased gasket resiliency and performance adjacent the inboard edge 30 of the gasket layer 26, 28. This also protects against any openings or possible seal leaks which might occur between the primary sealing beads 58 and the engine block 22.

As indicated above, it is preferred that the inner edges 30 of the gasket layers 26, 28 be radially aligned with the cylinder wall. Similarly, it is preferred that the inner edges of the intermediate layers and stopper layers 66 also be aligned with the walls or edges of the cylinder bores, or with the inner walls or edges of sleeve members if present. This preferred embodiment is shown in FIGS. 5A-5B.

The material for the gasket layers, intermediate layers and stopper layers can be what are typically used for components in cylinder head and exhaust manifold gaskets known today. Preferably, for the present invention, the gasket layers and stopper layers are made of stainless steel (for example, SS301 or SS201). It is possible for the stopper layer to be made of SS304 or cold roll steel. The intermediate layers are preferably made of cold roll steel, but also could be made of black plate, tin coated steel, or zinc plated steel.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

What is claimed is:
1. A gasket assembly comprising;
at least one gasket layer having an inboard edge circumscribing at least one aperture and an outboard region radially spaced from said aperture,
at least one primary sealing bead disposed along said gasket layer between said inboard edge and said outboard region wherein said primary sealing bead extends circumferentially about said aperture and radially along a first radial length,
at least one secondary sealing bead disposed along said gasket layer between said primary sealing bead and said inboard edge wherein said secondary sealing bead extends along a second radial length,
said secondary sealing bead having an ogee curved shape, said ogee curved shape having a pair of oppositely curving arcs each extending from a common tangent point and terminating at a pair of parallel ends,
wherein said secondary sealing bead provides a biasing force of said gasket layer adjacent said inboard edge,
a stopper layer adjacent at least a portion of said gasket layer, said stopper layer having substantially flat opposite sides extending radially from said outboard region to said inboard edge of said gasket layer to overlap said first radial length of said primary sealing bead and said second radial length of said secondary sealing bead; and
wherein said secondary sealing bead only extends around a portion of at least one of said at least one aperture, wherein said secondary sealing bead is adapted to be positioned in use at bridge areas of a cylinder aperture.

2. An assembly as set forth in claim 1 wherein said at least one secondary sealing bead extends circumferentially about and encloses at least one of said at least one aperture.

3. An assembly as set forth in claim 1 wherein said at least one gasket layer includes a plurality of metal gasket layers stacked in relation to one another.

4. An assembly as set forth in claim 3 further comprising an intermediary layer co-extensive with and disposed between one of said gasket layers and said stopper layer.

5. An assembly as set forth in claim 4 wherein said at least one secondary sealing bead includes said ogee curved shape opening away from said intermediary layer.

6. An assembly as set forth in claim 4 wherein said at least one secondary sealing bead includes said ogee curved shape opening towards said intermediary layer.

7. An assembly as set forth in claim 1 wherein said at least one gasket layer has a substantially constant material thickness extending between said inboard edge and said outboard region.

* * * * *